United States Patent
Matsuda

(10) Patent No.: US 8,283,848 B2
(45) Date of Patent: Oct. 9, 2012

(54) PHOSPHOR AND IMAGE DISPLAYING DEVICE EMPLOYING THE SAME

(75) Inventor: Naotoshi Matsuda, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 131 days.

(21) Appl. No.: 12/711,537

(22) Filed: Feb. 24, 2010

(65) Prior Publication Data

US 2011/0050089 A1    Mar. 3, 2011

(30) Foreign Application Priority Data

Sep. 3, 2009 (JP) .................. 2009-203851

(51) Int. Cl.
*H01J 1/62* (2006.01)
*C09K 11/56* (2006.01)

(52) U.S. Cl. ... 313/503; 313/504; 313/505; 252/301.4 S

(58) Field of Classification Search .......... 313/500–512
See application file for complete search history.

(56) References Cited

U.S. PATENT DOCUMENTS

| | | | | |
|---|---|---|---|---|
| 3,981,819 A * | 9/1976 | Yocom et al. | ........... | 252/301.4 S |
| 5,132,192 A * | 7/1992 | Sieber et al. | .................. | 428/690 |
| 5,926,239 A * | 7/1999 | Kumar et al. | ................... | 349/69 |
| 2007/0292631 A1* | 12/2007 | Shinozaki et al. | ............. | 428/1.1 |
| 2008/0179532 A1 | 7/2008 | Matsuda | | |

FOREIGN PATENT DOCUMENTS

| | | |
|---|---|---|
| JP | 2003-255320 | 9/2003 |
| JP | 2007-25621 | 2/2007 |
| JP | 2008-208328 | 9/2008 |

OTHER PUBLICATIONS

T. Yada et al., "Extended Abstracts of the 56th Spring Meeting of the Japan Society of Applied Physics and Related Societies," No. 31p-P11-20, 2009, p. 1489.

* cited by examiner

*Primary Examiner* — Tracie Y Green
(74) *Attorney, Agent, or Firm* — Oblon, Spivak, McClelland, Maier & Neustadt, L.L.P.

(57) ABSTRACT

The present invention provides a red-emitting phosphor emitting luminescence of excellent color purity with high efficiency under the excitation with near UV light, and it also provides a color image displaying device employing that phosphor. This phosphor comprises an $ARS_2$ matrix (A is at least one of Na, K and Rb, and R is at least one of Y, Gd and Lu) doped with 0.003 to 0.3 mol % of Bi and 0.1 to 3 mol % of Mn, and is suitable as a red-emitting phosphor used in a color image displaying device without a color filter.

7 Claims, 1 Drawing Sheet

PHOSPHOR AND IMAGE DISPLAYING DEVICE EMPLOYING THE SAME

CROSS-REFERENCE TO RELATED APPLICATION

This application is based upon and claims the benefit of priority from the prior Japanese Patent Application No. 2009-203851, filed on Sep. 3, 2009; the entire contents of which are incorporated herein by reference.

BACKGROUND OF THE INVENTION

1. Field of the Invention

The present invention relates to a red-emitting phosphor

2. Background Art

Liquid crystal displays have been popularly used as color image displaying devices in household TV sets and in information indicating instruments. A color liquid crystal display normally comprises a backlight which is a cool cathode fluorescent lamp or a light-emitting diode (hereinafter, referred to as "LED") emitting light containing red, blue and green components. The display also comprises a color filter that transmits the light components so selectively that each may corresponds to each of red, blue and green pixels, and the transmittance of the light penetrating through each color pixel is controlled by a liquid crystal element so as to produce a color gradation image. This displaying method is widely adopted at present. In the method, however, since white light is separated through the color filter, light in the wavelength range other than the displayed colors is shaded and hence not utilized. This means that energy of the light is wasted in the wavelength range other than the displayed colors, and therefore the above method is not of high energy use efficiency based on the total of light energy emitted from the LED.

In view of that, a new displaying method is proposed which uses plural phosphors capable of giving off luminescence of different colors. In the proposed method, each of the phosphors is provided on the place corresponding to the pixel of each luminescent color. Since each phosphor converts excitation energy into luminescence of the color similar to each pixel color, this method can improve efficiency both in energy use and in luminescence. JP-A 2003-255320 (KOKAI) discloses a liquid crystal display adopting this displaying method. The disclosed display comprises a fluorescent tube capable of emitting UV and blue light as an excitation source, and a color filter containing phosphors dispersed therein. Each of the phosphors emits luminescence of the color corresponding to the color displayed by each pixel. The publication also discloses examples of the phosphors usable in the display. However, although it is disclosed that UV and blue light is used as an excitation source, the above publication is silent about the advantage of near UV LED excitation light. JP-A 2007-25621 (KOKAI) discloses a color display comprising a blue excitation light source and phosphors capable of emitting red and green luminescence under the excitation with the blue light. In the disclosed display, the phosphors emitting red and green luminescence are used as red and green pixels, respectively. However, since the blue excitation light considerably leaks out from the red and green pixels, the display still needs to comprise a color filter in combination with the phosphors in order to improve the purity of the displayed colors. Consequently, the display adopting this displaying method inevitably has a complicated structure. This is a problem to improve. For the purpose of overcoming the problem, Yada et al. disclose a light-emitting type liquid crystal display comprising a near UV LED as an excitation source (see, Yada et al., Synopses of 56$^{th}$ symposium of applied physics and related societies, 31p-p11-20, pp. 1489 (2009), [in Japanese]). This liquid crystal display can show satisfying color images without a color filter even if the excitation light leaks out. That is because visual sensitivity to the near UV excitation light is too low to impair the color purity of displayed images. However, Yada et al. disclose the above display only conceptually, and actually they do not concretely show phosphors suitable for this displaying method. In other words, they are silent about phosphors capable of emitting luminescence under the excitation with the near UV light.

Recently, in the field of research on displays employing phosphors, researchers have paid their attention to near UV LEDs as excitation light sources emitting light at approx. 400 nm. However, when excited by the near UV LEDs, conventional red-emitting phosphors give off luminescence of unclear color with insufficient intensity. Accordingly, there is room for improvement in conventional red-emitting phosphors.

SUMMARY OF THE INVENTION

The present invention resides in a red-emitting phosphor, comprising
a matrix represented by the following formula (1):

$$ARS_2 \quad (1)$$

in which A is at least one element selected from the group consisting of Na, K and Rb; and R is at least one element selected from the group consisting of Y, Gd and Lu;
and
small amounts of Bi and Mn,
wherein the red-emitting phosphor emits red luminescence when exposed to light in the wavelength range of 380 to 430 nm.

The present invention also resides an image displaying device comprising
an excitation light source giving off near UV light having a peak in the wavelength range of 380 to 430 nm,
a phosphor layer comprising a phosphor emitting blue luminescence under the excitation with said near UV light,
a phosphor layer comprising a phosphor emitting green luminescence under the excitation with said near UV light, and
a phosphor layer comprising a phosphor emitting red luminescence under the excitation with said near UV light;
wherein
said phosphor layers are arranged in planar positions, according to each of which a liquid crystal element is provided so as to control transmittance of the excitation light or of the luminescence emitted from each corresponding phosphor, wherein said phosphor emitting red luminescence comprises a matrix represented by the above formula (1), and small amounts of Bi and Mn, wherein the red-emitting phosphor emits red luminescence when exposed to light in the wavelength range of 380 to 430 nm.

The present invention enables to realize a red-emitting phosphor emitting luminescence of excellent color purity with high efficiency under the excitation with near UV light. Further, this phosphor makes it possible to realize a color image displaying device capable of showing colors in a wide color reproduction range with high luminescence efficiency.

DETAILED DESCRIPTION OF THE INVENTION

Figure 1:
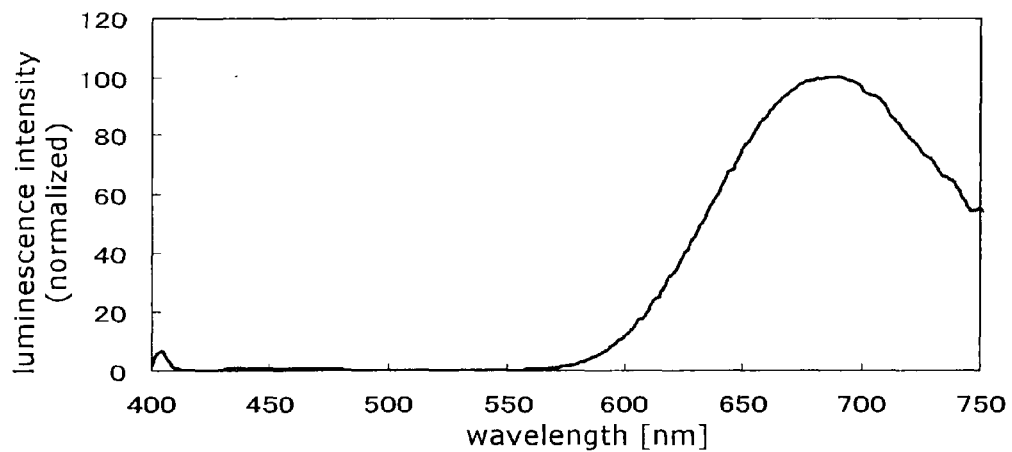
FIG. 1 is a normalized emission spectrum given by the phosphor NaGdS$_2$:Bi,Mn of Example 1 under the excitation with UV light at 254 nm.

The red-emitting phosphor according to the first aspect of the present invention comprises a sulfide of particular alkali metals and particular rare earth elements as a matrix, contains small amounts of Bi (bismuth) and Mn (manganese), and emits red luminescence when excited with near UV light. Here, the "near UV light" means light in the wavelength range of 380 to 430 nm. The present inventors have already developed and disclosed a phosphor in which various elements can be doped as activators into a matrix of alkali metal and rare earth element sulfide (JP-A 2008 208328 (KOKAI)). This patent publication discloses, as an example, a phosphor comprising an alkali metal and rare earth element sulfide matrix activated with either Bi or Mn. Further, in the publication, it is also described that a phosphor activated with both Bi and Pr (praseodymium) emits luminescence under the excitation of near UV light of 400 nm or shorter and that the substance can be used as a backlight of liquid crystal display.

However, the above substance disclosed in JP-A 2008 208328 (KOKAI), namely, the phosphor comprising an alkali metal and rare earth element sulfide matrix activated with both Bi and Pr is presumed to independently and simultaneously emit two kinds of luminescence, one of which is attributed to the Bi ion and the other of which is attributed to the Pr ion. Accordingly, it is presumed that there is no specific interaction between Bi and Pr.

The above presumption is based on the following facts. A phosphor activated with Pr alone exhibits the maximum luminescence intensity when excited at approx. 350 nm, and the luminescence intensity deceases according as the excitation wavelength becomes longer. If the excitation wavelength is longer than 400 nm, the luminescence from the Pr ion cannot be observed. On the other hand, a substance activated with Bi alone shows the maximum intensity when excited at approx. 410 nm.

Meanwhile, the substance activated with both Bi and Pr gives off both kinds of luminescence attributed to Bi and Pr when excited at 400 nm or shorter. However, under the excitation at the wavelength suitable for the Bi ion, for example, at 410 nm, the luminescence attributed the Bi ion is observed but that attributed the Pr ion is not at all. This means that, even if the Bi ion is excited, the energy does not transfer from Bi to Pr.

In contrast, although the phosphor of the present invention comprises an alkali metal and rare earth element sulfide doped with both Bi and Mn, the light given off therefrom is presumed not to be independently and simultaneously emitted two kinds of luminescence attributed to the individual activating elements but to be an emission caused by interaction of the activating elements.

This presumption is based on the following facts. A phosphor of the sulfide doped with Bi alone emits blue luminescence when excited with near UV light. On the other hand, a substance of the sulfide doped with Mn alone hardly gives off light when excited with near UV light but emits red luminescence when excited with light at a shorter wavelength, for example, with UV light at 300 nm or shorter. Because not of low luminescence efficiency but of low light absorption, the substance doped with Mn alone hardly emits light when excited with near UV light.

The phosphor activated with both Bi and Mn gives off not blue but red light, namely, luminescence attributed to the Mn ion, when excited with near UV light. On the other hand, however, it emits luminescence attributed to the Bi ion with remarkably lowered intensity, as compared with the substance activated with the same amount of Bi alone.

The present inventors' study has revealed that this phenomenon is caused by energy transfer from the Bi ion to the Mn ion when the phosphor of the present invention is excited with near UV light of 380 to 430 nm. The energy transfer is presumed to enhance not the blue luminescence attributed to the Bi ion but the red attributed to the Mn ion. As a result, red luminescence of high intensity can be obtained if the phosphor of the present invention, namely, the substance comprising an alkali metal and rare earth element sulfide doped with both Bi and Mn is excited with near UV light in the wavelength range of 380 to 430 nm. As long as the present inventors know, there is no report about such energy transfer from Bi ions to Mn ions.

In the first aspect of the present invention, the alkali metal in the matrix is restricted to Na (sodium), K (potassium) or Rb (rubidium). The group of alkali metals include other metals such as Li (lithium) and Cs (cesium), but if these metals are used it is very difficult to obtain a phosphor emitting luminescence of high intensity. On the other hand, the rare earth element in the matrix is also restricted to Y (yttrium), Gd (gadolinium) or Lu (lutetium). If rare earth elements other than them are used, it is also very difficult to obtain a substance emitting luminescence of high intensity. Thus, if a sulfide of elements other than the defined ones is used as a matrix, it is difficult to obtain a substance emitting luminescence of high intensity. This is presumed to be because the matrix other than defined in the present invention does not have a proper structure. The matrix of the elements defined in the present invention has a crystal structure belonging to hexagonal systems, but that of the other elements hardly has a hexagonal system crystal structure. In other words, the phosphor of the present invention preferably has a crystal structure of hexagonal system. As long as the crystal structure belongs to hexagonal systems, the matrix may contain small amounts of elements other than the defined ones in the present invention.

In the alkali metal and rare earth element sulfide matrix, the atomic ratio of alkali metal:rare earth element:sulfur is ideally 1:1:2, but the practical ratio is often different from that by a several percents. Further, the sulfur atoms may be partly replaced with oxygen atoms. Even in those cases, the luminescence intensity can be kept high if the crystal structure is an α-NaFeO2 type hexagonal system.

In the first aspect of the present invention, the content of Bi is in the range of preferably 0.003 to 0.3 mol %, more preferably 0.01 to 0.3 mol %, based on the alkali metal-rare earth element sulfide matrix ARS$_2$. If the Bi content is below the above range, the intensity of the red luminescence is liable to weaken. If it is higher than 0.3 mol %, the blue luminescence component attributed to the Bi ion is liable to increase and accordingly it may result in failure to obtain favorable emission color. On the other hand, the content of Mn is in the range of preferably 0.1 to 3 mol %, more preferably 0.1 to 1 mol %, based on the alkali metal-rare earth element sulfide matrix ARS$_2$. If the Mn content is out of the above range, the red luminescence intensity is liable to lower.

Further, the molar ratio Bi/Mn is preferably less than 1/3. If the ratio of Bi to Mn is too high, the blue component increases and hence it may be difficult to obtain favorable emission color. The molar ratio Bi/Mn is also preferably 1/100 or more, further preferably 1/30 or more. If the ratio of Bi to Mn is too low, the excitation energy less transfers to Mn and consequently the luminescence intensity is liable to weaken.

The above-described phosphor comprising the sulfide matrix can be produced according to any known method. In the production process, compounds of the alkali metal A, the rare earth element R, Bi, Mn and sulfur are mixed so that the desired component ratio can be obtained, and then the prepared mixture is fired at a high temperature to produce the phosphor. For example, salts such as carbonates, oxides or sulfides of the alkali metal A, the rare earth element R, Bi and Mn are used as the starting materials, and the mixture thereof is fired in an atmosphere of inert gases or hydrogen sulfide to produce the phosphor.

The phosphor of the present invention can be thus produced by firing compounds, such as sulfides and oxides, of the constituting metal elements in a sulfur-containing atmosphere such as hydrogen sulfide. In the production process, it is important to control the atmosphere in firing. If fired in an oxygen-containing atmosphere, the materials are readily oxidized. Accordingly, it is necessary to fire the materials in an atmosphere containing oxygen in an amount as small as possible. If oxygen-containing compounds such as oxides are used as the materials, the firing procedure needs to be performed in a reductive atmosphere such as hydrogen sulfide atmosphere for removing the oxygen.

In producing the phosphor of the present invention, it is also important to control the firing temperature. If the firing temperature is too high, the alkali metal constituting the sulfide matrix may be volatized and/or the crystal structure may transform into cubic system, so that the luminescence intensity may be remarkably lowered. The inventors' study has revealed that the upper limit of the firing temperature is approx. 1200° C. although it depends on the combination of elements constituting the matrix. On the other hand, in order to produce the phosphor of the present invention by firing, the firing procedure is preferably carried out at a temperature of approx. 600° C. or higher. The firing time is normally 0.5 to 5 hours.

The image displaying device according to the second aspect of the present invention comprises: an excitation light source giving off near UV light, a phosphor layer comprising a phosphor emitting blue luminescence when excited with the near UV light, a phosphor layer comprising a phosphor emitting green luminescence when excited with the near UV light, and a phosphor layer comprising a phosphor emitting red luminescence when excited with the near UV light. Those phosphor layers are arranged in planar positions, and a liquid crystal element for controlling transmittance is provided at a place determined according to the position of each phosphor layer. The device of the second aspect of the present invention is characterized in that the phosphor emitting red luminescence is according to the first aspect of the present invention. This device can have a generally known fundamental structure, which is, for example, disclosed by Yada et al. The device does not employ a color filter, and the displayed colors depend on the colors of luminescence emitted by the phosphors. This is a characteristic of the displaying device according to the present invention.

In the displaying device according to the second aspect of the present invention, the phosphor emitting blue luminescence is preferably a blue phosphor comprising a matrix represented by the following formula (2):

$$NaRS_2 \tag{2}$$

(in which R is at least one element selected from the group consisting of Y, Gd and Lu), containing 0.01 to 1 mol % of Bi, and emitting blue luminescence when exposed to light in the wavelength range of 380 to 430 nm. The present inventors disclose this blue phosphor in JP-A 2008 208328 (KOKAI). It has been found that, if the above blue phosphor is used in the device according to the second aspect of the present invention, the color reproduction range is expanded to further improve the properties of the device.

The device according to the second aspect of the present invention adopts near UV light of 380 to 430 nm as excitation light for stimulating the phosphors. If the wavelength of the excitation light is shorter than 380 nm, not only the red and blue phosphors are liable to emit luminescence of poor intensity, but also materials of the device parts, such as glass and resins, generally have such low transmittances that they cannot satisfyingly transmit the excitation light to decrease the amount of the light exciting the phosphors. As a result, the emission efficiency of the device is liable to lower. On the other hand, however, if the excitation light has a wavelength longer than 430 nm, each phosphor also may show low luminescence intensity. Further, in that case, blue component increases in the excitation light. Since the blue component has high visual sensitivity, displayed red and green colors may be contaminated to be made bluish with the excitation light partly leaking out. Consequently, there is fear of narrowing the color reproduction range. Concrete examples of the excitation light source include light-emitting diodes and semiconductor lasers emitting light having a peak wavelength within 380 to 430 nm. Particularly preferred is a near UV LED in view of easiness of installing to the device, color reproduction, and cost. The excitation light can be applied to the phosphors either directly or indirectly, for example, via a light guide plate.

In the displaying device according to the second aspect of the present invention, the phosphor emitting red luminescence is the aforementioned particular red-emitting phosphor. This phosphor emits red luminescence of high intensity and of high color purity when excited with near UV light in the above range, and hence is effective in expanding the color reproduction range. As for the phosphor emitting blue luminescence, the above-described blue phosphor is preferably employed but it is possible to use other known phosphors provided that they emit blue luminescence of high intensity and of high color purity when excited with near UV light. On the other hand, as the phosphor emitting green luminescence, known green phosphors can be used. Examples of the usable green phosphors include $SrGa_2S_4$:Eu and Eu-activated SiAlON phosphors disclosed in, for example, Fukuda, et al., Proceedings of the 15$^{th}$ International Display Workshop, PH1-2, pp. 803 (2009). They emit green luminescence of high intensity and of high color purity when excited with near UV light.

The device according to the second aspect of the present invention employs liquid crystal elements as transmittance controllers with which color images can be displayed. The liquid crystal elements may be placed either between the excitation light source and the phosphor layers or behind the phosphor layers as viewed from the side of the excitation light source. This means that the liquid crystal elements may control either the excitation light intensity or the luminescence from the phosphor layers, respectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

EXAMPLES

Embodiments of the present invention are explained below in detail.

Example 1

Reference Example 1 and Comparative Example 1

As the starting materials, $Na_2CO_3$, $Gd_2O_3$, $Bi_2O_3$ and $MnCO_3$ in the amounts of 5.56 g, 17.9 g, 0.012 g and 0.11 g, respectively, were weighed and mixed. The molar ratio of them was 1.05:0.9895:0.0005:0.02. The mixture was placed in an alumina crucible and then fired at 1000° C. for 3 hours under hydrogen sulfide atmosphere. The fired product was pulverized in a mortar, and then washed and dried to obtain $NaGdS_2$:Bi,Mn, which was a phosphor of Example 1. The obtained phosphor contained almost all the amounts of Bi and Mn in the starting materials, and the contents of them were 0.05 mol % and 1 mol %, respectively. The molar ratio Bi/Mn was 1/20.

Subsequently, a phosphor of Reference Example 1 was prepared. As the starting materials, $Na_2CO_3$, $Gd_2O_3$ and $Bi_2O_3$ in the amounts of 5.56 g, 18.1 g and 0.023 g, respectively, were weighed and mixed. The molar ratio of them was 1.05:0.999:0.001. From the mixture of the starting materials, $NaGdS_2$:Bi as the phosphor of Reference Example 1 was produced in the same manner as described above.

Thereafter, a comparative phosphor of Comparative Example 1 was prepared. As the starting materials, $Na_2CO_3$, $Gd_2O_3$ and $MnCO_3$ in the amounts of 5.56 g, 17.9 g and 0.11 g, respectively, were weighed and mixed. The molar ratio of them was 1.05:0.99:0.02. From the mixture of the starting materials, $NaGdS_2$:Mn as the phosphor of Comparative Example 1 was produced in the same manner as described above.

Figure 2:
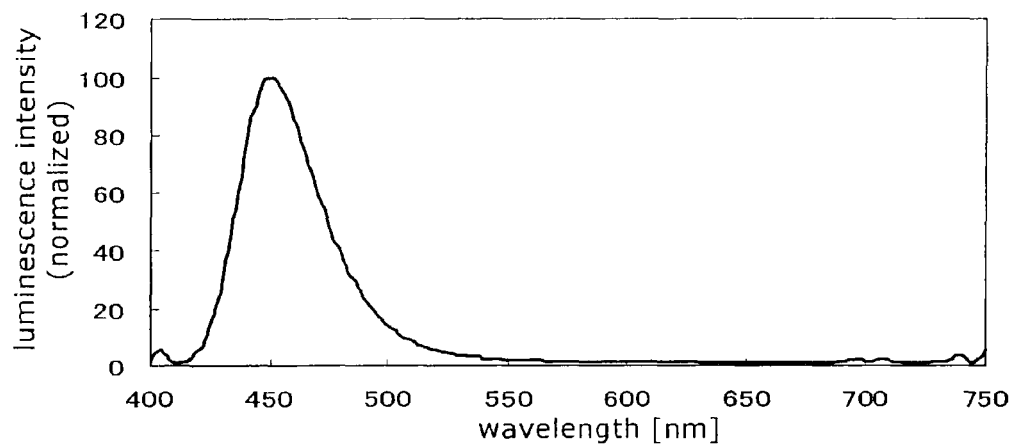
FIG. 2 is a normalized emission spectrum given by the phosphor NaGdS$_2$:Bi of Reference Example 1 under the excitation with UV light at 254 nm.

The above phosphors were subjected to X-ray diffraction measurement, and thereby it was verified that all of them exhibited diffraction patterns similar to the pattern of $NaGdS_2$ having a hexagonal crystal system. The phosphors were then exposed to near UV LED light having a peak wavelength of 400 nm, and luminescence emitted from each phosphor was observed. As a result, the phosphors of Example 1 and Reference Example 1 gave off red and blue emissions, respectively, so clearly that they could be seen by eyes, but the phosphor of Comparative Example 1 emitted weak red luminescence. The luminescence intensity (height of the emission spectrum) of Example 1 and that of Comparative Example 1 in the wavelength range of 600 to 700 nm were compared with each other, and it was found that the latter was only 27% of the former. The phosphors of Example 1 and Reference Example 1 were excited with UV light at 254 nm to obtain emission spectra shown in FIGS. 1 and 2, respectively. The emission spectrum of Comparative Example 1 was also measured under the excitation with the same UV light, and thereby it was found that the luminescence intensity of Comparative Example 1 was 2.8 times larger than that of Example 1. Those indicates showed that the phosphor containing both Bi and Mn (phosphor of Example 1) was different from the phosphor containing Bi alone (phosphor of Reference Example 1) in luminescence color and also that it emitted red luminescence of remarkably enhanced intensity as compared with the phosphor containing Mn alone (not containing Bi) (phosphor of Comparative Example 1) under the excitation with near UV light. Since the difference in luminescence intensity is caused by whether Bi was contained or not, it is presumed that the energy transferred from Bi to Mn.

Image Displaying Devices D1, DR1 and DR2

Figure 3:
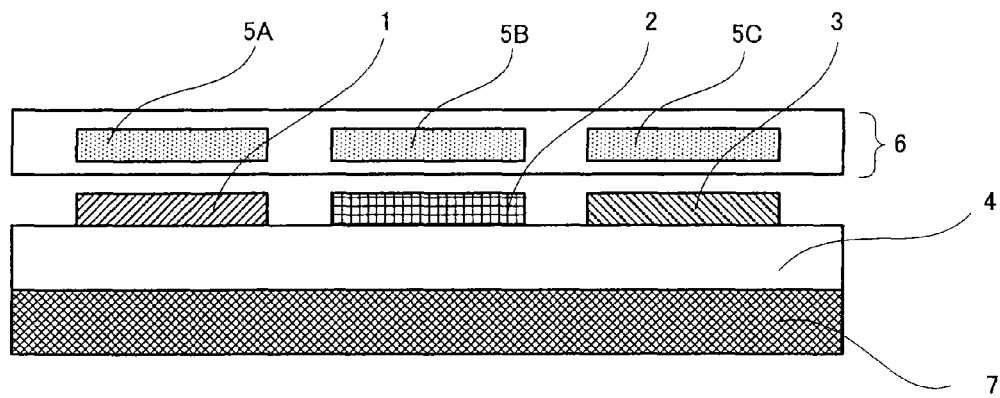
FIG. 3 is a schematic sectional view illustrating the structure of the image displaying device according to the present invention.

With respect to the image displaying device of the present invention, its structure and the process for production thereof are described below by referring to FIG. 3. The phosphor of Example 1, a known phosphor $SrGa_2S_4$:Eu, and the phosphor of Reference Example 1 were employed as the red, green and blue phosphors, respectively. The phosphors were coated on a glass substrate (4) in a striped pattern by, for example, printing to form a pattern of the phosphor layers (1 to 3). In FIG. 3, each of the three rectangles 1, 2 and 3 one-to-one stands for each of the red, blue and green phosphor layers. However, the number of each phosphor layer is normally two or more. The pitch of the striped pattern was made the same as that of the liquid crystal array described later. The glass substrate comprising the phosphor pattern thus formed thereon was mounted on an array (7) of LEDs giving off near UV light having a peak wavelength of 400 nm. Further, thereon a liquid crystal array (6) in which many liquid crystal elements (5) were arranged on a matrix was so placed that the planar positions of the liquid crystal elements might correspond to those of the phosphor layers in the striped pattern, to produce a simple image displaying device (D1) as an embodiment according to the second aspect of the present invention. The produced displaying device (D1) was worked to display red light only, which was observed to find that the displayed red color was represented by (0.640, 0.295) in terms of (x, y) coordinate in the CIE color diagram. In the same manner, it was found that the displayed green and blue colors were represented by (0.274, 0.686) and (0.155, 0.070), respectively. The above red, green and blue color coordinates were converted into (u', v') coordinates, which were then plotted on the CIE (u', v') color diagram to form a triangle. The area of the formed triangle (color reproduction range) was compared with that of the NTSC standard, which is a well-known typical standard for color image displaying. As a result, the three-color triangle given by the device according to the present invention had such a large area as corresponded to 99% of that regulated by the NTSC standard. In the displaying device D1, the liquid crystal elements were placed on the view side so as to control how much luminescence radiated from the displaying screen. However, the liquid crystal elements may be placed between the phosphor layers and the excitation light source. In that case, the liquid crystal elements control the intensity of light exciting the phosphor layers.

Independently, for producing a comparative image displaying device (DR1), the above near UV LEDs were replaced with commercially available white LEDs in which blue LEDs and yellow phosphors were used in combination. Further, the above glass substrate provided with the phosphor pattern was also replaced with a glass substrate on which commercially available color filters for liquid crystal were arranged in a striped pattern. The comparative device (DR1) thus produced displayed red, green and blue colors represented by (0.599, 0.356), (0.350, 0.579) and (0.148, 0.112), respectively. The triangle formed by the coordinates of the displayed three colors had such a small area as corresponded to only 52% of the three-color triangle area regulated by the NTSC standard. The devices D1 and DR1 were compared in screen brightness under the same power supply when the liquid crystal elements were fully opened. As a result, the device D1 was 1.2 times brighter than the comparative device DR1.

In order to compare the phosphor of the present invention with known phosphors, the above procedure was repeated except that CaAlSiN$_3$:Eu and BaMgAl$_{10}$O$_{17}$:Eu, which are known to have excellent luminescence properties, were used as red and blue phosphors, respectively, to produce another comparative displaying device (DR2). The device DR2 exhibited such slightly improved screen brightness as was 1.3 times brighter than the device DR1, but the three-color triangle of the device DR2 had such a small area as corresponded to 90% of the NTSC standard. It may be thought possible to expand the area of the three-color triangle and to improve the color reproductivity of the device employing the above phosphors in combination, for example, if the luminescence color of CaAlSiN$_3$:Eu is shifted to have higher color purity. Actually, however, it is very difficult to improve the color reproductivity. For example, even if the Eu content in CaAlSiN$_3$:Eu is increased, the luminescence intensity thereof is known to decrease. In contrast, the red-emitting phosphor according to the first aspect of the present invention gives off luminescence of both favorable color and sufficient intensity, and hence enables the displaying device to have excellent color reproductivity.

Example 2

Reference Example 2 and Image Displaying Devices D2

As the starting materials, Na$_2$CO$_3$, Y$_2$O$_3$, Bi$_2$O$_3$ and MnCO$_3$ in the amounts of 5.56 g, 13.5 g, 0.023 g and 0.11 g, respectively, were weighed and mixed. The molar ratio of them was 1.05:0.989:0.001:0.02. From the mixture of the starting materials, NaYS$_2$:Bi,Mn as a phosphor of Example 2 was produced in the same manner as described in Example 1. The obtained phosphor contained almost all the amounts of Bi and Mn in the starting materials, and the contents of them were 0.1 mol % and 1 mol %, respectively. The molar ratio Bi/Mn was 1/10. The phosphor was then exposed to near UV LED light having a peak wavelength of 400 nm, to find that the luminescence intensity of the produced phosphor was almost the same as that of Example 1 and clearly higher than that of Comparative Example 1 in the red wavelength range of 600 to 700 nm.

Subsequently, as the starting materials, Na$_2$CO$_3$, Lu$_2$O$_3$ and Bi$_2$O$_3$ in the amounts of 5.56 g, 19.9 g and 0.023 g, respectively, were weighed and mixed. The molar ratio of them was 1.05:0.999:0.001. From the mixture of the starting materials, NaYS$_2$:Bi as a phosphor of Reference Example 2 was produced in the same manner as described in Example 1. The production procedure of D1 was repeated except that the phosphors of Example 2 and Reference Example 2 were used as the red and blue phosphors, respectively, to produce an image displaying device D2. The device D2 displayed red, green and blue colors represented by (0.646, 0.299), (0.274, 0.686) and (0.183, 0.066), respectively. The green color had the same coordinate as that of the device D1. The three-color triangle had such a large area as corresponded to 100% of that of the NTSC standard. Further, the device D2 exhibited such good screen brightness as was 1.2 times brighter than the device DR1 under the same power supply.

Image Displaying Devices D3

The production procedure of D1 was repeated except that the green phosphor SrGa$_2$S$_4$:Eu was replaced with Sr$_3$Si$_{13}$Al$_3$O$_2$N$_{21}$:Eu, which was developed by Fukuda et al., to produce an image displaying device D3. The device D3 displayed red and blue colors of the same color coordinates as the device D1 and green color of (0.241, 0.568). The three-color triangle had such a large area as corresponded to 93% of that of the NTSC standard. Further, the device D3 exhibited such good screen brightness as was 1.7 times brighter than the device DR1 under the same power supply.

Example 3

As the starting materials, Na$_2$CO$_3$, Gd$_2$O$_3$, Bi$_2$O$_3$ and MnCO$_3$ in the amounts of 8.35 g, 27.2 g, 0.010 g and 0.017 g, respectively, were weighed and mixed. The molar ratio of them was 1.05:0.9987:0.0003:0.002. From the mixture of the starting materials, NaGdS$_2$:Bi,Mn as a phosphor of Example 3 was produced in the same manner as described in Example 1. The obtained phosphor contained almost all the amounts of Bi and Mn in the starting materials, and the contents of them were 0.03 mol % and 0.1 mol %, respectively. The molar ratio Bi/Mn was 3/10. The phosphor was then exposed to near UV LED light having a peak wavelength of 400 nm, to find that the luminescence intensity of the produced phosphor was approx. 50% based on that of Example 1 but clearly higher than that of Comparative Example 1 in the red wavelength range of 600 to 700 nm.

Example 4

As the starting materials, K$_2$CO$_3$, Gd$_2$O$_3$, Bi$_2$O$_3$ and MnCO$_3$ in the amounts of 10.88 g, 27.1 g, 0.010 g and 0.052 g, respectively, were weighed and mixed. The molar ratio of them was 1.05:0.9967:0.0003:0.006. From the mixture of the starting materials, KGdS$_2$:Bi,Mn as a phosphor of Example 4 was produced in the same manner as described in Example 1. The obtained phosphor contained almost all the amounts of Bi and Mn in the starting materials, and the contents of them were 0.03 mol % and 0.3 mol %, respectively. The molar ratio Bi/Mn was 1/10. The phosphor was then exposed to near UV LED light having a peak wavelength of 400 nm, to find that the luminescence peak was blue-shifted to 630 nm and that the luminescence intensity was enhanced to be approx. 110% based on that of Example 1 in the red wavelength of 600 to 700 nm.

Example 5

As the starting materials, Rb$_2$CO$_3$, Gd$_2$O$_3$, Bi$_2$O$_3$ and MnCO$_3$ in the amounts of 18.19 g, 27.1 g, 0.010 g and 0.052 g, respectively, were weighed and mixed. The molar ratio of them was 1.05:0.9967:0.0003:0.006. From the mixture of the starting materials, RbGdS$_2$:Bi,Mn as a phosphor of Example 5 was produced in the same manner as described in Example 1. The obtained phosphor contained almost all the amounts of Bi and Mn in the starting materials, and the contents of them were 0.03 mol % and 0.3 mol %, respectively. The molar ratio Bi/Mn was 1/10. The phosphor was then exposed to near UV LED light having a peak wavelength of 400 nm, to find that the luminescence had a peak at approx. 610 nm and that the luminescence intensity was approx. 60% based on that of Example 1 but clearly higher than that of Comparative Example 1 in the red wavelength range of 600 to 700 nm.

The invention claimed is:
1. A red-emitting phosphor, comprising:
a matrix represented by the following formula (1):

$$ARS_2 \qquad (1)$$

in which A is at least one element selected from the group consisting of Na, K and Rb; and R is at least one element selected from the group consisting of Y, Gd and Lu; and small amounts of Bi and Mn, wherein the content of Bi is 0.003 to 0.3 mol %, the content of Mn is 0.1 to 3 mol %, and the molar ratio of Bi/Mn is less than ⅓, and wherein the red-emitting phosphor emits red luminescence when exposed to light in the wavelength range of 380 to 430 nm.

2. The phosphor according to claim 1, having a crystal structure of hexagonal system.

3. The phosphor according to claim 2, whose crystal structure is an α-NaFeO$_2$ type hexagonal system in which the sulfur atoms are partly replaced with oxygen atoms.

4. An image displaying device comprising:

an excitation light source giving off near UV light having a peak in the wavelength range of 380 to 430 nm, a phosphor layer comprising a phosphor emitting blue luminescence under the excitation with said near UV light, a phosphor layer comprising a phosphor emitting green luminescence under the excitation with said near UV light, and a phosphor layer comprising a phosphor emitting red luminescence under the excitation with said near UV light, and comprising:

a matrix represented by the following formula (1):

$$ARS_2 \qquad (1)$$

in which A is at least one element selected from the group consisting of Na, K and Rb; and R is at least one element selected from the group consisting of Y, Gd and Lu;

and small amounts of Bi and Mn, wherein the content of Bi is 0.003 to 0.3 mol %, the content of Mn is 0.1 to 3 mol %, and the molar ratio of Bi/Mn is less than ⅓;

wherein said phosphor layers are arranged in planar positions, according to each of which a liquid crystal element is provided so as to control transmittance of the excitation light or of the luminescence emitted from each corresponding phosphor.

5. The device according to claim 4, wherein said blue-emitting phosphor comprises:

a matrix represented by the following formula (2):

$$NaRS_2 \qquad (2)$$

in which R is at least one element selected from the group consisting of Y, Gd and Lu, and 0.01 to 1 mol % of Bi, wherein blue-emitting phosphor emits blue luminescence when exposed to light in the wavelength range of 380 to 430 nm.

6. The device according to claim 4, wherein said excitation light source is a near UV light-emitting diode.

7. The phosphor according to claim 1, wherein A is Na.

* * * * *